Feb. 24, 1970 J. J. GAFFNEY ET AL 3,496,664

LAYOUT COMPUTER

Filed Nov. 22, 1967 2 Sheets-Sheet 1

INVENTORS.
JAMES J. GAFFNEY
JOHN A. URIAN
BY Seidel & Gonda
ATTORNEYS.

LAYOUT COMPUTER

Filed Nov. 22, 1967 2 Sheets-Sheet 2

INVENTORS.
JAMES J. GAFFNEY
JOHN A. URIAN
BY Seidel & Gonda
ATTORNEYS.

United States Patent Office 3,496,664

Patented Feb. 24, 1970

3,496,664

LAYOUT COMPUTER

James J. Gaffney, 60 Letitia Lane, Media, Pa. 19063, and John A. Urian, 6 Binford Lane, Devonshire, Wilmington, Del. 19803

Filed Nov. 22, 1967, Ser. No. 685,207
Int. Cl. G09f *11/24*
U.S. Cl. 40—86 6 Claims

ABSTRACT OF THE DISCLOSURE

A layout computer having side-by-side layout forms and including a housing divided into two sections, a supply spool and a take-up spool mounted within each section, a light transmitting top surface in the housing and illumination means within each of the sections, a border support mounted above the top surface by links which permit it to move toward and away from the surface, said boarder support removably retaining transparent sheets with boarder indicia thereon, and a plurality of rollers for guiding sheet material from a supply spool to a take-up spool between the top surface and the support, and a reversible drive for each set of spools.

This invention relates to a layout computer. More particularly, this invention relates to apparatus for assisting the unskilled in composing and otherwise laying out copy prior to printing the same.

For those lacking skill in the assembly of works for printing, the layout of the material in a manner which is both informative and aesthetically pleasing can be quite difficult indeed. For example, high school students, students in journalism, club and other organizational members, often desire to assemble works for printing. Typical examples of these types of works are high school and college yearbooks, school newspapers, a book consisting of lists of contributors and advertisers for organizational functions, and many other books of this generic type. The present invention assists in making the layout by producing a combination of visual observation and work table where the layouts are presented in an orientation and position not differing from the actual pages to be laid out. The present invention provides an apparatus whereby the layout of such books can be simplified and improved.

In accordance with the present invention, apparatus is provided whereby a user may selectively choose from a series of layouts, a page or two pages which suit his particular requirements. These two pages may be aligned in side-by-side relation so that the user may observe their appearance and matching qualities in direct relation to the work which is being performed. In accordance with the present invention, the particular pages are imprinted on elongated sheets of material which are adapted to be traversed across the top surface of a housing. Such sheets of imprinted material are mounted in side-by-side relation so that the user may see the selected pages in the same relationship as in an open book.

The present invention will be described in relation to a high school yearbook. However, those skilled in the art would readily recognize that its uses are unlimited in respect to the purpose to which it may be applied.

It therefore is a general object of the present invention to provide a new and unobvious layout computer.

Another object of the present invention is to provide apparatus whereby yearbooks and other work may be assembled with facility by those unskilled in this art. Thus, it may be used as a teaching aid for reading, mathematics, spelling, and the like. For example, it could be used to match pictures; match words; match colors; and match parts of equations.

Yet another object of the present invention is to provide a new and unobvious apparatus for displaying layout sheets in side-by-side relation for the assembly of printed works.

Other objects will appear hereinafter.

For the purpose of illustrating the invention, there is shown in the drawings a form which is presently preferred; it being understood, however, that this invention is not limited to the precise arrangements and instrumentalities shown.

Referring now to the drawings in detail, wherein like numerals indicate like elements, there is shown in FIGURE 1, a layout computer designated generally as 10.

Figures 2, 5:
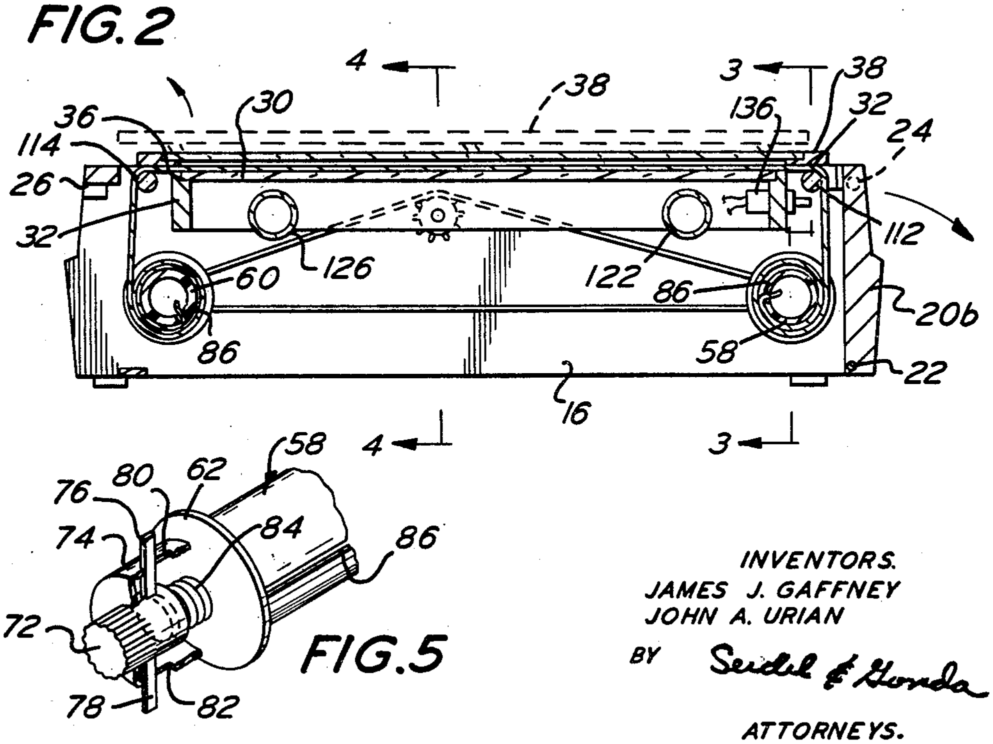
FIGURE 2 is an enlarged transverse sectional view of the computer illustrated in FIGURE 1 taken along the line 2—2.
FIGURE 5 is a partial perspective view of a spool used with the present invention.

The computer 10 includes a housing 12 having side walls 14 and 16, removable back wall 18 and pivotable front walls 20*a* and 20*b*. As best shown in FIGURE 2, the front wall 20*b* pivots about the pin 22 and is latched in an upright position by the friction catch 24. The front wall 20*a* is connected and held in the same manner. Back wall 18 is removably connected by any conventional means, such as friction catches extending downwardly from its horizontal portion into the shoulders 26.

Figures 3, 4:
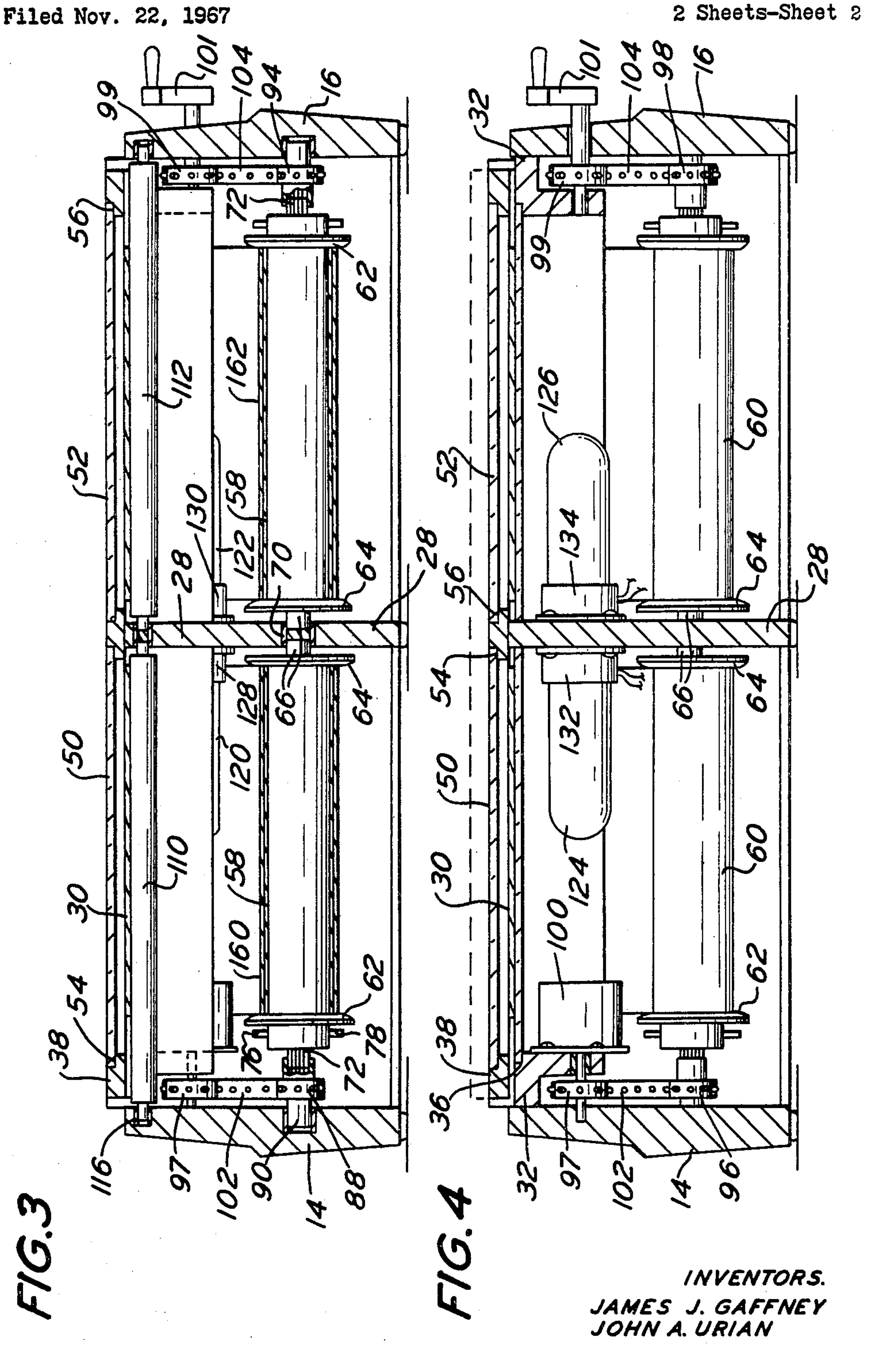
FIGURE 3 is a longitudinal sectional view of the layout computer taken along the line 3—3 in FIGURE 2.
FIGURE 4 is a longitudinal sectional view of the layout computer taken along the line 4—4 in FIGURE 2.

As best shown in FIGURES 3 and 4, the housing 12 is divided into two sections by the central wall 28 which extends downwardly from the top wall 30. Top wall 30 comprises a rectangular frame 32 which is against and supported by the side walls 14 and 16. The frame 32 also extends across the housing 12 in a longitudinal direction at a position somewhat set in from the back wall 18 and the front walls 20*a* and 20*b*. This is best illustrated by reference to FIGURES 2 and 4. The frame 32 supports the light transmitting sheet of material 34 which fits in a shoulder 36. The light transmitting sheet material 34 is preferably of a translucent type such as milk white plastic or frosted glass which diffuses light.

Overlying the top wall 30 is a support 38 which comprises a rectangular frame divided into two sections by a central post 40. The support 38 is fixed to the top wall 30 in a manner that permits it to be moved toward and away from it while maintaining a parallel relationship. This is accomplished by a plurality of elongated bars 42 which are pivotably connected to the support 38 by pins 44. As shown, there are three bars 42 on each side of the support 38. The bars 42 are bifurcated at one end and extend into the elongated slots 46 where they engage the second pin 48. The bars 42 are also free to rotate about the pin 48. As thus supported, the support defines a parallelogram with the top wall 30. In other words, it may be moved toward and away from the top wall 30 by pivoting the bars 42 about their respective pins. As it is so moved, the support 38 constantly maintains a parallel relationship with the top wall 30. When it is desired to maintain the support 38 spaced away from the top wall 30, the bars 42 are pivoted from the position shown in FIGURE 1 to a position wherein they are somewhat past the vertical and rest against the sides of the slots 46. The support 38 can be removed entirely from the top wall by simply pulling directly upward which causes the bars 42 to disengage from the pins 48.

As indicated above, the post 40 divides the support 38 into two sections. Each section removably supports a transparent sheet of material 50 and 52. In the preferred embodiment, the transparent sheets of material 50 and 52 are preferably made of a clear plastic. As best shown in FIGURES 3 and 4, the transparent sheets of material 50 and 52 are removably held in the support 38 by resting them on shoulders 54 and 56 which define the perimeter of each setion of the support 38.

In this manner, the sheets 50 and 52 may be removed from the support 38 and replaced by other sheets which are similar in size. In the preferred embodiment, the two openings defined by the frame 32 and post 40 represent the largest page size which would normally be laid out. For smaller pages, different sheets 50 and 52 of the same size but with their borders darkened to define a smaller internal rectangle can be substituted.

A supply spool 58 and takeup spool 60 are mounted within each section of the housing 12. Each spool, 58 and 60, is identical. Accordingly, only one such spool need be described in detail. As shown, each spool includes a pair of flanges 62 and 64 which are spaced apart by an amount equal to the width of the material to be wound onto or off of them. Each spool terminates in a spindle 66 which fits within a blind opening in the wall 28. If desired, a bushing 70 can be provided in each opening.

As best shown in FIGURE 5, the opposite end of each spool 58 or 60 is provided with a spindle 72 having splines formed on the outer periphery thereof. The splines are adapted to engage a drive cog to be described below. Each spindle 72 slideably fits within an opening in the end of the housing 74 of the spools 58 or 60. A pair of pins 76 and 78 are fixed to diametrically opposite sides of the spindle 72 and extend through diametrically aligned slots 80 and 82 in the housing 74. The pins 76 and 78 cooperate with the slots 80 and 82 to define the limits to which the spindle 72 may be reciprocated. A spring 84 is fixed to the flange 62 and normally biases the spindle 72 outwardly from the housing 74. Thus, the spindle 72 normally assumes the position illustrated in FIGURE 5. The length of the slots 80 and 82 permits the spindle 72 to be reciprocated back into the housing 74 to a position where its outermost surface is flush with the front surface of the housing 74. This permits the spool 58 or the spool 60 to be removed. Each of the spools 58 and 60 is provided with a slot 86 into which the end of the material to be rolled onto the spool may be inserted. This is best illustrated in FIGURE 2.

As best shown in FIGURE 3, each of the spindles 72 extending from the spool 58 and 60 is engaged in an internal-external sprocket 88 whose internal opening has mating splines to receive the splines on the end of spindle 72. Sprocket 88 is, of course, in axial alignment with the bushing 70. The sprocket 88 is also provided with a spindle 90 which is rotatably positioned in an opening in the wall 14. Similar sprockets 94, 96 and 98 are rotatably supported by the walls 14 and 16 as required.

As best shown in FIGURE 4, drive sprockets 97 and 99 are rotatably supported to the walls 14 and 16. The sprocket 97 is driven by an electric motor 100 which depends from the frame 32. The sprocket 99 is driven by a hand crank 101 which extends through the wall 16. Of course both sprockets 97 and 99 could be driven by an electric motor or by hand crank if desired. An endless belt 102 extends about each of the sprockets 88, 96 and 97. Similar endless belt 104 extends around and engages each of the sprockets 94, 98 and 99. Thus, rotation of sprocket 97 or roation of sprocket 99 drives either endless belt 102 or endless belt 104 and causes rotation of the parallel spools 58 and 60.

Four guide rollers 110, 112, 114 and a fourth roller (not shown) are rotatably mounted adjacent both sides of both sections of the frame forming part of the top wall 30. The four guide rollers are mounted with their axes parallel to the spools 58 and 60 and generally directly above them. The guide rollers 110, 112, and 114 are preferably made of aluminum and mounted in bearings 116, as shown in FIGURE 3.

When put to use, sheet material is normally wound onto the spools 58 which are then inserted into the apparatus 10 in the manner described above. Thereafter, the leader from each of the spools 58 is taken off and threaded over one of the rollers 110 or 112 and over the top wall 30 but beneath the support 38. The leader is then threaded over the guide roller 114 or its counterpart (not shown) and engaged with one of the spools 60.

Illumination of the top wall 30 is provided by four incandescent lamps 120, 122, 124 and 126 mounted two to a section. Lamps 120–126 are mounted in conventional 120-volt A.C. sockets 128, 130, 132, 134 which are mounted on the central wall 28. Appropriate electrical conductors are provided as well as a single-pole control switch 136 for each section. Thus, each section may be individually illuminated by the incandescent lamps. If desired, other types of illumination may be substituted such as fluorescent lamps.

The motor 100 is preferably of the 120-volt A.C. reversing type. Control is achieved by the reversing switch 140 which when pushed causes the motor to drive in a first direction and when pulled causes the motor to reverse and drive in the opposite direction.

The operation of the layout computer 10 is described in conjunction with the laying out of a year book for a high school or university. However, those skilled in the art would recognize that it has other uses such as defined above. The sheet material 160 wound on spool 58 comprises a series of layouts which may be effectively used for a particular page. In a like manner, the sheet material 162 contains a series of the same or similar layouts. Since the operator will have a basic knowledge of what he is trying to achieve in laying out a particular page, he therefore energizes the motor 100 or drives the crank 101 to cause the suggested layouts to pass under the sheets 50 and 52. Of course, the sheets 50 and 52 will have previously been selected to have border sizes which duplicate the size of the page being laid out. In addition, the spools 58 and 60 will be mounted with layouts for pages of that particular size. As soon as a page bearing a suggested layout suitable to the user's needs appear beneath the sheet 50, for example, the user will align it and then stop the motor 100. During translation of the sheets 160 and 162, the support 38 is raised above the top wall 30.

Figure 1:
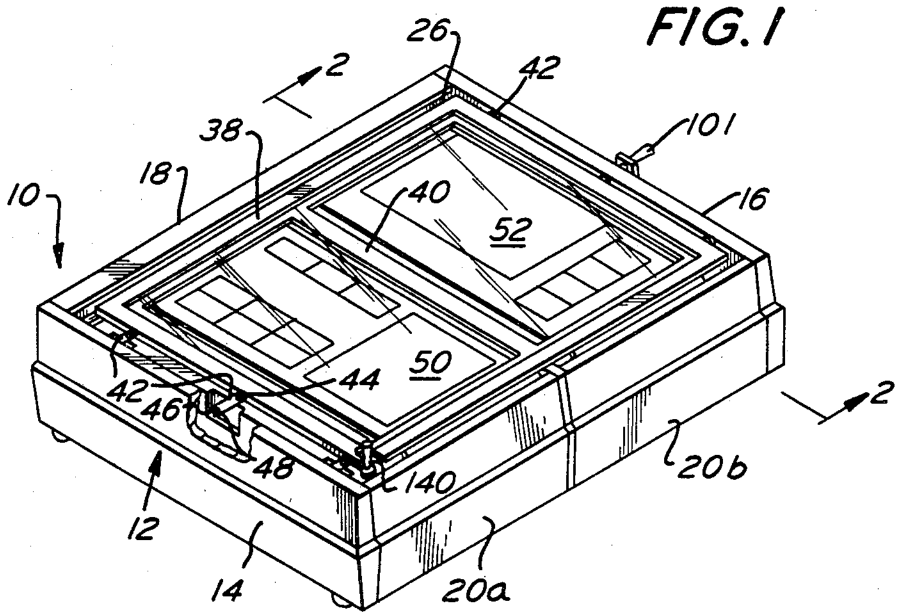
FIGURE 1 is a perspective view of a layout computer constructed in accordance with the present invention.

After having selected a left-hand page, as indicated in FIGURE 1, the user next will proceed to operate the crank 101 in a like manner to bring a layout for the facing page beneath the sheet 52. The selection of the layout for facing a right-hand page will depend upon the particular aesthetic result which the user desires to achieve. Once the layout for the facing page has been achieved, the support 38 is lowered against the top wall 30. Thereafter, the user may position the material which will form the page on the sheets 50 and 52 to finally determine what the two pages will look like. If it is satisfactory, then the material can be removed and permanently assembled for printing.

In another embodiment of the invention, two extra sets of spools and their related structure can be mounted to allow material to traverse the top at 90° with respect to sheets 50 and 52. These latter sheets of material would be made of a clear, flexible plastic such as acetate so as not to obscure the sheets 50 and 52. These latter sheets can carry additional indicia such as examples of type so that the size and style of the type can be observed in direct relation to the proposed layout.

The present invention may be embodied in other specific forms without departing from the spirit or essential attributes thereof and, accordingly, reference should be made to the appended claims, rather than to the foregoing specification, as indicating the scope of the invention.

We claim:

1. A layout computer comprising a housing, said housing being divided into at least two sections, a supply spool and a take-up spool mounted within each section, said supply spool and take-up spool being spaced apart and having parallel axes, a light transmitting top wall for each of said sections, illumination means within each of said sections, a support mounted above said top wall, means mounting said support for movement toward and away from said top wall, said support including means for retaining transparent sheets with border indicia thereon, means for guiding material bearing layout indicia from said supply spool between said top wall and said support to said take-up spool, and means for reversibly driving said supply and take-up spools, said take-up spools being positioned in side-by-side relation, said supply spools being positioned in side-by-side relation whereby said sheet material is positioned in side-by-side relation between said top wall and said support.

2. A layout computer in accordance with claim 1 wherein said guide means comprise at least two freely rotating rollers at either end of said top wall.

3. A layout computer in accordance with claim 1 wherein said mounting means comprise a plurality of elongated members pivotally connected to said support and pivotally connected to said housing, whereby said support and top wall define a parallelogram.

4. A layout computer in accordance with claim 1 wherein said means for retaining said transparent sheets includes means for releasably retaining said transparent sheets, whereby said transparent sheets may be interchanged.

5. A layout computer in accordance with claim 1 wherein said drive means includes a sprocket mounted on each of said spools, an endless belt engaging said sprockets, and means to cause translation of said belt.

6. A layout computer comprising a housing, said housing being divided into at least two sections, a supply spool and a take-up spool mounted within each section, said supply spool and take-up spool being spaced apart and having parallel axes, a light transmitting top wall for each of said sections, illumination means within each of said sections, a support mounted above said top wall, said support including means for retaining a border member for each section, means for varying the sizes of said border member, means for guiding material bearing layout indicia from said supply spool between said top wall and said support to said take-up spool, means for reversibly driving said supply and take-up spools, said take-up spools being positioned in side-by-side relation, said supply spools being positioned in side-by-side relation whereby said sheet material is positioned in side-by-side relation between said top wall and said support.

References Cited

UNITED STATES PATENTS

| | | | |
|---|---|---|---|
| 620,777 | 3/1899 | Hoskin | 40—86 |
| 1,595,115 | 8/1926 | Myers. | |
| 2,800,733 | 7/1957 | Chevillon | 40—31 |
| 3,364,604 | 1/1968 | Donaldson et al. | 35—76 X |

EUGENE R. CAPOZIO, Primary Examiner

WILLIAM H. GRIEB, Assistant Examiner